United States Patent
Sharma et al.

(10) Patent No.: US 7,321,854 B2
(45) Date of Patent: Jan. 22, 2008

(54) PROSODY BASED AUDIO/VISUAL CO-ANALYSIS FOR CO-VERBAL GESTURE RECOGNITION

(75) Inventors: Rajeev Sharma, State College, PA (US); Mohammed Yeasin, Utica, NY (US); Sanshzar Kettebekov, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 792 days.

(21) Appl. No.: 10/666,460

(22) Filed: Sep. 19, 2003

(65) Prior Publication Data

US 2004/0056907 A1    Mar. 25, 2004

Related U.S. Application Data

(60) Provisional application No. 60/413,998, filed on Sep. 19, 2002.

(51) Int. Cl.
G10L 15/00 (2006.01)
(52) U.S. Cl. .................. 704/243; 704/276
(58) Field of Classification Search .............. 704/243, 704/276, 246
See application file for complete search history.

(56) References Cited

U.S. PATENT DOCUMENTS

| H1497 H * | 10/1995 | Marshall ............ 704/276 |
| 6,275,806 B1 * | 8/2001 | Pertrushin ............ 704/272 |
| 6,788,809 B1 * | 9/2004 | Grzeszczuk et al. ...... 382/154 |
| 7,036,094 B1 * | 4/2006 | Cohen et al. ............ 715/863 |
| 2006/0210112 A1 * | 9/2006 | Cohen et al. ............ 382/103 |

OTHER PUBLICATIONS

Nakamura et al. "multimodal multi-view integrated database for human behavior understanding" 1998 IEEE pp. 540-545.*
Bolt, "Put-that-there: Voice and gesture at the graphic interface," In *SIGGRAPH-Computer Graphics*, 1980.
Lenman et al., "Computer Vision Based Hand Gesture Interfaces for Human-Computer Interaction," KTH (Royal Institute of Technology), Stockholm, Sweden, Jun. 2002.
Pavlovic et al., "Visual interpretation of hand gestures for human-computer interaction: A review," *IEEE Trans on Pattern Analysis and Machine Intelligence*, vol 19, pp. 677-695, 1997.
Kettebekov et al., "Toward Natural Gesture/Speech Control of a Large Display," *Engineering for Human Computer Interaction*, vol. 2254, "Lecture Notes in Computer Science," Little & Nigay, eds., Berlin Heidelberg New York: Springer Verlag, pp. 133-146, 2001.
Krahnstoever et al., "A Real-Time Framework for Natural Multimodal Interaction with Large Screen Displays," *Proc. Intl. Conf. On Multimodal Interfaces*, Pittsburgh, USA, pp. 349-354, 2002.

(Continued)

*Primary Examiner*—Daniel Abebe
(74) *Attorney, Agent, or Firm*—Synnestvedt & Lechner LLP

(57) ABSTRACT

The present method incorporates audio and visual cues from human gesticulation for automatic recognition. The methodology articulates a framework for co-analyzing gestures and prosodic elements of a person's speech. The methodology can be applied to a wide range of algorithms involving analysis of gesticulating individuals. The examples of interactive technology applications can range from information kiosks to personal computers. The video analysis of human activity provides a basis for the development of automated surveillance technologies in public places such as airports, shopping malls, and sporting events.

19 Claims, 4 Drawing Sheets

OTHER PUBLICATIONS

Sharma et al., "Speech/gesture interface to a visual-computing environment," *IEEE Computer Graphics and Applications*, vol. 20, pp. 29-37, 2000.

Rigoll et al., "High Performance Real-Time Gesture Recognition Using Hidden Markov Models," *Gesture and Sign Language in Human-Computer Interaction*, vol. LNAI 1371, M. Frohlich, ed., pp. 69-80, 1997.

Wilson et al., "Hidden Markov Models for Modeling and Recognizing Gesture Under Variation," *Hidden Markov Models: Applications in Computer Vision.*, T. Caelli, ed.: World Scientific, pp. 123-160, 2001.

Oviatt et al., "Integration and synchronization of input modes during multimodal human-computer interaction," *Proc. Conf. On Human Factors in Computing Systems* (CHI '97), pp. 415-422, 1997.

Oviatt, S., "Taming Speech Recognition Errors Within a Multimodal Interface," *Communications of the ACM*, vol. 43(9), pp. 45-51, 2000.

Sowa et al., "Coverbal iconic gestures for object descriptions in virtual environments: An empirical study," *Proc. Conf. On Gestures: Meaning and Use*,j Porto, Portugal, 1999.

Sowa et al., "Temporal Symbolic Integration Applied to a Multimodal System Using Gestures and Speech," *Gesture-Based Communication in Human-Computer Interaction*, vol. LNAI 1739, A.B. E. Al., Ed., Berlin: Springer-Verlag, pp. 291-302, 1999.

deCuetos et al., "Audio-visual intent-to-speak detection for human-computer interaction," *Proc. ICASSP*, Istanbul, Turkey, pp. 1325-1328, 2000.

Luettin et al., "Continuous Audio-Visual Speech Recognition," *Proc. 5th European Conf on Computer Vision*, 1998.

Benoit et al., "Audio-Visual and Multimodal Speech Systems," *Handbook of Standards and Resources for Spoken Language Systems*, D. Gibbon, Ed., 1998.

Basu et al., "Towards Measuring Human Interactions in Conversational Settings," *Proc. IEEE Intl. Workshop on Cues in Communication* (CUES 2001) at DVPR 2001, Kauai, Hawaii, 2001.

Graf et al., "Visual Prosody: Facial Movements Accompanying Speech," *Proc. Fifth IEEE Intl. Conf. On Automatic Face and Gesture Recognition* (FG'02), 2002.

Kettebekov and Sharma, "Understanding gestures in multimodal human computer interaction," *Intl. J. On Artificial Intelligence Tools*, vol. 9, pp. 205-224, 2000.

Kita et al., "Movement phases in signs and co-speech g estures, and their transcription by human coders," *Proc. Intl. Gesture Workshop*, pp. 23-35, 1997.

Quek et al., "Gesture and speech cues for conversational interaction," submitted to *ACM Transactions on Computer-Human Interaction*, also as *VISLAb Report: VISLab-01-01*, 2001.

Azoz et al., "Reliable tracking of human arm dynamics by multiple cue integration and constraint fusion," *Proc. IEEE Conf. On Computer Vision and Pattern Recognition*, 1998.

Boersma, P., "Accurate short-term analysis of the fundamental frequency and the harmonics-to-noise ration of a sampled sound," *Institute of Phonetic Sciences of the University of Amsterdam*, vol. 17, pp. 97-110, 1993.

Beckman, M.E., "The parsing of prosody," *Language and Cognitive Processes*, vol. 11, pp. 17-67, 1996.

Taylor, P., "The rise/fall/connection model of intonation," *Speech Communication*, vol. 15, pp. 169-186, 1994.

Yeo et al., "A new family of power transformations to improve nomality or symmetry," *Biometrica*, vol. 87, pp. 954-959, 2000.

Chickering et al., "A Bayesian approach to learning Bayesian networks with local structure," *Proc. 13th Conf. On Uncertainty in Artificial Intelligence*, Providence, RI, pp. 80-89, 1997.

Wexelblat, A., "An Approach to Natural Gesture in Virtual Environments," MIT Media Laboratory, pp. 1-17, 1995.

Sharma et al., "Speech-Gesture Driven Multimodel Interfaces for Crisis Management," submitted to *Proc. Of IEEE Special Issue on Multimodal Human-Computer Interface*, pp. 1-48 (no publication date provided).

Poddar et al., "Toward Natural Gesture/Speech HCI: A Case Study of Weather Narration," pp. 1-6 (no publication date provided).

Wilson et al., "Realtime Online Adaptive Gesture Recognition," (no publication date provided).

Wilson et al., "Parametric Hidden Markov Models for Gesture Recognition," *IEEE Transactions on Pattern Analysis and Machine Intelligence*, vol. 21, No. 9, pp. 884-900, 1999.

Kim and Chien, "Analysis of 3D Hand Trajectory Gestures Using Stroke-Based Composite Hidden Markov Models," *Applied Intelligence*, vol. 15, pp. 131-143, 2001.

Gullberg, M., "Gesture in Spatial Descriptions," *Working Papers*, Lund University, Dept. Of Linguistics, vol. 47, pp. 87-97, 1999.

McNeill, D., "Gesture and Language Dialectic," *Acta Linguistica Hafniensia* green, pp. 1-25, 2002.

Henriques et al., "Geometric computations underlying eye-hand coordination: orientations of the two eyes and the head," *Exp. Brain Res.*, vol. 152, pp. 70-78, 2003.

Desmurget et al., "Constrained and Unconstrained Movements Involve Different Control Strategies," *Rapid Communication*, The American Physiological Society, pp. 1644-1650, 1997.

Krauss and Hadar, "The Role of Speech-Related Arm/Hand Gestures in Word Retrieval," pre-editing version of a chapter that appeard in R. Campbell & L. Messing (eds.), *Gesture, speech and sign*, 93-116, 2001.

Kingston, J., "Extrapolating from Spoken to Signed Prosody via Laboratory Phonology," *Language and Speech*, vol. 42 (2-3), pp. 251-281, 1999.

Wachsmuth, I., "Communicative Rhythm in Gesture and Speech," (no publication date provided).

Nakatani, C.H., "The Computational Processing of Intonational Prominence: A Functional Prosody Perspective," thesis presented to the Division of Engineering and Applied Sciences, Harvard University, 1997.

Wolff et al., "Acting on a visual world: the role of perception in multimodal HCI," (no publication date provided).

* cited by examiner

PROSODY BASED AUDIO/VISUAL CO-ANALYSIS FOR CO-VERBAL GESTURE RECOGNITION

CROSS-REFERENCE TO RELATED APPLICATIONS

This application is based on and claims priority to U.S. Provisional Application No. 60/413,998, filed Sep. 19, 2002, which is fully incorporated herein by reference.

GOVERNMENT SPONSORSHIP

This work was supported in part by the National Science Foundation pursuant to CAREER Grant IIS-97-33644 and Grant No. NSF IIS-0081935. Accordingly, the United States government may have certain rights in this invention.

BACKGROUND OF THE INVENTION

In combination, gesture and speech constitute the most important modalities in human-to-human communication. People use a large variety of gestures, either to convey what cannot always be expressed using speech only, or to add expressiveness to the communication. There has been a considerable interest in incorporating both gestures and speech as a means for improving the design and implementation of interactive computer systems, a discipline referred to as Human-Computer Interaction (HCI). In addition, with the tremendous growth in demand for novel technologies in the surveillance and security field, the combination of gestures and speech are important sources for biometric identification.

Although speech and gesture recognition have been studied extensively, most of the attempts at combining them in a multimodal interface to improve their classification have been semantically motivated, e.g., word—gesture co-occurrence modeling. The complexity of semantic analysis limited the state of the art of systems that employ gestures and speech to the form of predefined signs and controlled syntax such as "put <point> that <point> there", which identifies the co-occurrence of the keyword "that" and a pointing gesture. While co-verbal gesticulation between humans is virtually effortless and exceedingly expressive, "synthetic" gestures tend to inflict excessive cognitive load on a user, consequently defeating the purpose of making HCI natural. Part of the reason for the slow progress in multimodal HCI is the prior lack of available sensing technology that would allow non-invasive acquisition of signals (i.e., data) identifying natural behavior.

The state of the art in continuous gesture recognition is far from meeting the "naturalness" requirements of multimodal Human-Computer Interaction (HCI) due to poor recognition rates. Co-analysis of visual gesture and speech signals provides an attractive prospect for improving continuous gesture recognition. However, lack of a fundamental understanding of the underlying speech/gesture production mechanism has limited the implementation of such co-analysis to the level where a certain set of spoken words, called keywords, can be statistically correlated with certain gestures, e.g., the term "OK" is correlated with the familiar gesture of the thumb and forefinger forming a circle, but not much more.

Although the accuracy of isolated sign recognition has reached 95%, the accuracy of continuous gesture recognition in an uncontrolled setting is still low, nearing an accuracy level of only 70%. A number of techniques have been proposed to improve kinematical (visual) modeling or segmentation of gestures in the traditionally applied HMM frameworks. Nevertheless, due to a significant share of extraneous hand movements in unconstrained gesticulation, reliance on the visual signal alone is inherently error-prone.

Multimodal co-analysis of visual gesture and speech signals provide an attractive means of improving continuous gesture recognition. This has been successfully demonstrated when pen-based gestures were combined with spoken keywords. Though the linguistic patterns significantly deviated from the one in canonical English, co-occurrence patterns have been found to be effective for improving the recognition rate of the separate modalities. Previous studies of Weather Channel narration have also shown a significant improvement in continuous gesture recognition when those were co-analyzed with selected keywords. However, such a multimodal scheme inherits an additional challenge of dealing with natural language processing. For natural gesticulation, this problem becomes even less tractable since gestures do not exhibit one-to-one mappings of form to meaning. For instance, the same gesture movement can exhibit different meanings when associated with different spoken context; at the same time, a number of gesture forms can be used to express the same meaning. Though the spoken context is extremely important in the understanding of a multimodal message and cannot be replaced, processing delays of the top-down improvement scheme for gesture recognition negatively affect the task completion time.

Signal-level fusion has been successfully applied from audio-visual speech recognition to detection of communication acts. Unlike lip movements (visemes), gestures have a loose coupling with the audio signal due to the involvement of the different production mechanisms and frequent extraneous hand movements. The variety of articulated movements also separates hand gestures from the rest of the non-verbal modalities. For instance, while head nods, which have been found to mark accentuated parts of speech, have only several movement primitives, gestures are shaped by the spatial context to which they refer. These factors notably complicate the audio-visual analysis framework that could be applied for continuous gesture recognition.

In pursuit of more natural gesture based interaction, the present inventors previously introduced a framework called iMap. In iMap, a user manipulates a computerized map on a large screen display using free hand gestures and voice commands (i.e., keywords). A set of fundamental gesture strokes (i.e., strokes grouped according to similarity in the smallest observable arm movement patterns, referred to as "primitives") and annotated speech constructs were recognized and fused to provide adequate interaction. The key problem in building an interface like iMap is the lack of existing natural multimodal data. In a series of previous studies, data from Weather Channel broadcasts was employed to bootstrap gesture-keyword co-analysis in the iMap framework. The use of the Weather Channel data offers virtually unlimited bimodal data. Comparative analysis of both domains indicated that the meaningful gesture acts are co-verbal and consist of similar gesture primitives.

In human-to-human communication, McNeill distinguishes four major types of gestures by their relationship to speech. Deictic gestures are used to direct a listener's attention to a physical reference in the course of a conversation. These gestures, mostly limited to pointing, were found to be coverbal. From previous studies in the computerized map domain, over 93% of deictic gestures were observed to co-occur with spoken nouns, pronouns, and spatial adverbials. A co-occurrence analysis of the weather narration data revealed that approximately 85% of the time when any meaningful strokes are made, they are accompanied by a spoken keyword mostly temporally aligned during and after the gesture. This knowledge was previously applied to keyword level co-occurrence analysis to improve continuous gesture recognition in the previously-mentioned weather narration study.

Of the remaining three major gesture types, iconic and metaphoric gestures are associated with abstract ideas, mostly peculiar to subjective notions of an individual. Finally, beats serve as gestural marks of speech pace. In the Weather Channel broadcasts the last three categories constitute roughly 20% of the gestures exhibited by the narrators.

Extracting relevant words and associating these relevant words with gestures is a difficult process from the natural language understanding (computational processing) point of view. In addition, gestures often include meaningless but necessary movements, such as hand preparation and retraction; however, only meaningful parts of gestures (strokes) can properly be associated with words. Further, the ambiguity of associating gesture motion and gesture meaning (e.g., the same gestures can refer to different meanings) makes the problem of associating gestures with words even more difficult.

SUMMARY OF THE INVENTION

The present invention provides an automated procedure for improving the accuracy of a computer algorithm to recognize human gestures in a video sequence. In accordance with the present invention, acoustic cues and visual cues are correlated using training techniques to recognize and identify meaningful gestures. The term "meaningful gesture" is defined as an arm movement (or other body movement, e.g., head, torso, etc.) that can be associated with the meaning of spoken context or purposeful acoustic emphasis made by a speaker. More specifically, the acoustic cues comprise, according to the present invention, prosodic (e.g., intonation, pauses, volume, etc.) data that is analyzed in correlation with accompanying visual gestures, and then these correlations are tested against known information regarding what the combined prosodic and gestural cues signify. In this manner, both meaningful and non-meaningful prosody/gesture combinations are identified and used to identify the occurrence of gesture recognition in audio/video sequences.

In accordance with the present invention, a subject stands in front of a display such that his or her hands and head are in the field of view of the system's camera, and sound gathering equipment records sounds corresponding to the image recorded by the camera. An audio/visual signal that presents a combination of head and hands movement, and sounds occurring simultaneously therewith, is extracted and classified into known gesture categories (visual) and "prosody categories" (speech). These acoustic and visual cues extracted from the audio/video are used to recognize meaningful gestures. Thus, an objective of the invention is to provide a computational method of co-analyzing visual gestures and emphasized segments in the associated speech (as opposed to words per se) observed in a gesticulating subject. The prosodic features that constitute emphasis in the subject's voice are extracted as a combination of tonal and voiceless transition features. The information derived from the co-analysis is used to improve intelligibility of small, but nonetheless meaningful, visual gesture movements that are common in spontaneous communication.

Using a Bayesian formulation, the prosodic features from the speech signal are co-analyzed with the visual signal to learn the prior probability of co-occurrence of the prominent spoken segments with the particular kinematical phases of gestures. The co-analysis helps in detecting and identifying small hand movements, which subsequently improves the rate of continuous gesture recognition.

DETAILED DESCRIPTION OF THE INVENTION

Figure 1:
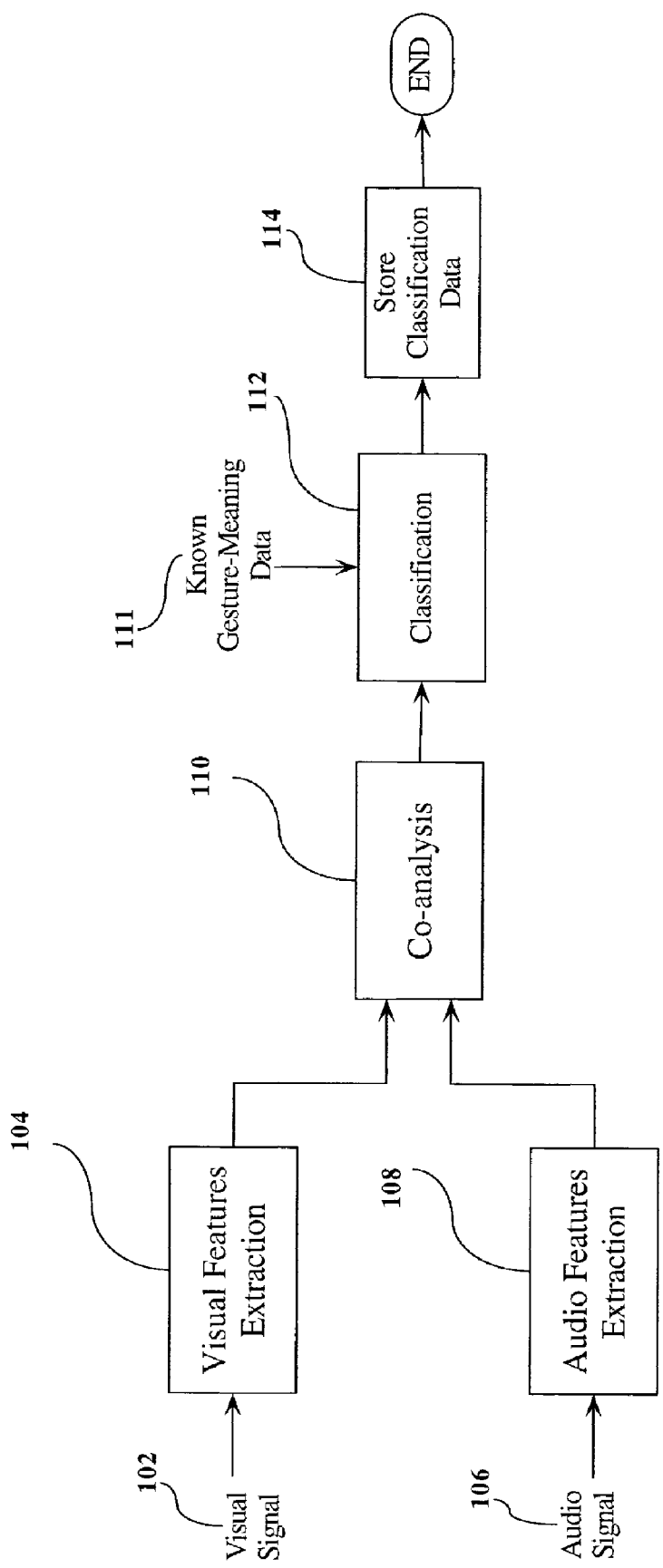
FIG. 1 illustrates a training process performed in accordance with the present invention.

The present invention presents a non-keyword based technique for gestural behavior analysis. As described in the example below, the present invention can be utilized to improve accuracy of continuous gesture classification. It is based on the psycho-physiological characteristics exhibited during gesture and speech production and therefore can be applied, for example, to contextual, biometrical, and emotional analysis.

The present invention as illustrated herein focuses on the deictic gestures (not limited to pointing) because they are more common for large display interaction and are relatively consistent in coupling with speech. However, the invention is not limited to deictic gestures and can be applied equally to other gesturic categories, such as beats, iconic, and metaphoric. Both psycholinguistic and HCI (iMap) studies suggest that deictic gesture strokes do not exhibit one-to-one mapping of form to meaning, i.e., the prior methods, while adequate, are still subject to significant inaccuracy. Previous experiments have shown that semantic categories of strokes (derived through keyword associations), not the gesture primitives per se, correlate with the temporal alignment of keywords.

The present method is demonstrated on two types of gestural acts that refer to a static point in space (e.g., a city) and those indicating a moving object (e.g., movement of a precipitation front).

In the psycholinguistic literature, Kendon described that the stroke of the gesture precedes or ends at, but does not follow, the phonological peak syllable of speech. Instead of determining a peak syllable for the stroke of gesture (defined by its peaking effort) the method of the present invention creates a generic model for all types of gesture segments. One unique aspect of the current approach is the discovery that various phases of gestures have distinguished patterns of tonal and voiceless transitions characteristics of the associated speech intervals, and the use of this discovery in a novel way. The novel technique does not distinguish between traditional structural units of speech intervals such as syllables or words. It utilizes tonal features extracted from the pitch of the voice and establishes their association with moving limbs of the body. However, the pitch signal, in addition to the useful features e.g., tonal accents, also encapsulates phonetic variations of different sounds. The phonological dependency of the pitch is resolved by extraction of point features from the pitch contour and corresponding points from velocity of the hand (or other gesturing element) that are less subjected to those variations.

Thus, the preferred embodiment does not require use of traditional speech recognition algorithms and subsequent natural language processing, and their accompanying shortfalls. Due to the potential errata in the use of traditional speech processing methods, the use of the physiological characteristics in natural communication is more reliable and a less complex method to increase the accuracy of gesture recognition.

A continuous hand gesture consists of a series of qualitatively different kinematical phases such as movement to a position, a hold at a position, and transitional movement between two positions. The present inventors adopt Kendon's framework by organizing these gestures into a hierarchical structure. He proposed a notion of gestural unit (phrase) that starts at the moment when a limb is lifted away from the body and ends when the limb moves back to the resting position. The stroke is distinguished by a peaking effort and it is thought to constitute the meaning of a gesture. After extensive analysis of gestures in weather narration and iMap the following strokes are considered: contour, point, and circle.

In a preferred embodiment, the analysis comprises at least two parts which are combined using a statistical technique. First, a sequence of images (video) containing a gesticulating subject, are examined for the purpose of extracting the positional data of the subject's hands and head at each frame (other positional data could, of course, be substituted, e.g., full body posture data). The sequence of the positional data is transformed to a sequence of velocity and acceleration features. The resultant feature sequence is compared to previously derived statistical representations of unique gesture classes and movement phases that constitute those classes. The statistical likelihood for every category of visual gesture signal is computed.

Second, to improve classification accuracy, the preferred embodiment employs a combination of visual and acoustic features. The changes in the positional data of the hand (and/or head) are co-analyzed with the acoustically prominent pitch segments extracted from the speech signal that corresponds to the movement. A set of relevant feature points are extracted from both prominent pitch segments and the velocity profile of the hand movement. Velocity data is pre-segmented such that the segment intervals correspond to the duration of each gesture primitive. The temporal alignment of the feature points is compared with a previously learned statistical pattern for every trained gesture act category. The information from the co-analysis is used to derive the probability of considering a gesture class as a true state of the observed co-verbal and gesticulation pattern. Finally, the gesture recognition algorithm uses a statistical formulation to join the likelihood of visual signal occurrence and probability of co-analysis pattern for classification purposes.

As will be described below in the example, the efficacy of the present method has been successfully demonstrated on a large collection of video sequences from "Weather Channel" broadcasts. A 12% improvement in the accuracy of the automatic gesture recognition over the visual-only approach was obtained. The co-analysis method and system of the present invention provides a solution for identifying visually non-obvious gesticulative acts and distinguishing visually similar phases of co-verbal gestures. The tested formulation did not incorporate the notion of movement phases that constitute the recognizable gesture classes. Use of the data relating to these movement phases allows more elaborate co-analysis of the tonal representation of voice and hand kinematics by distinguishing two different feature levels: phases of hand movement and gesture classes. As a consequence, the recognition rates of meaningful gestures is further improved.

This invention correlates spoken prosody attributes, in particular, $F_0$ contour (pitch variation) and voiceless intervals (pauses), with hand kinematics. This formulation accounts for both discourse and phonological levels of speech-gesture synchronization.

FIG. 1 illustrates a training process performed in accordance with the present invention. The training process includes visual and acoustic signal co-analysis processes. A visual signal 102 is subjected to a visual feature extraction at step 104, whereby, as described in more detail below, the visual signal is analyzed to identify perceptible features of the visual signal. Similarly, an audio signal 106 is subjected to an audio features extraction step 108, whereby perceptible features of the audio signal are identified. At step 110, the visual features and audio features extracted are subjected to a co-analysis step, whereby each visual feature is correlated to audio features occurring simultaneously with the visual action.

At step 112, the co-analyzed elements are classified, based upon previous knowledge of what the actions (visual and audio) actually mean (i.e., from the known gesture-meaning-data 111). At step 114, the results of the classification step 112 are stored for use in analyzing newly input data as described below with respect to FIG. 2.

Figure 2:
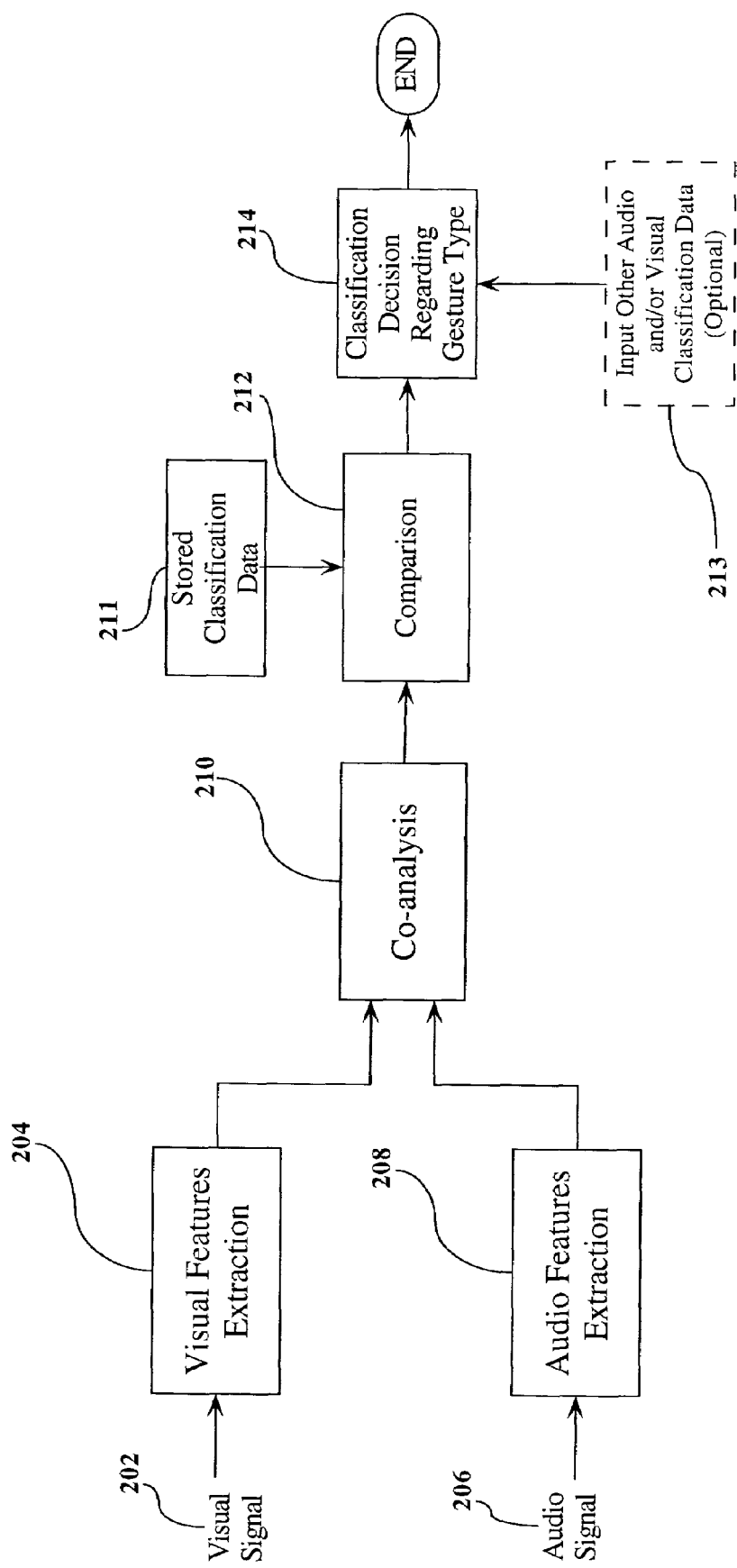
FIG. 2 illustrates the use of the data derived in the training steps of FIG. 1 to analyze newly acquired data.

FIG. 2 illustrates the use of the data derived in the training steps of FIG. 1 to analyze newly acquired data. Steps 202-212 are essentially identical to the steps described with respect to FIG. 1 for preparation of the model. The only difference between steps 102-112 of FIG. 1 and steps 202-212 of FIG. 2 is that the visual signal 202 and audio signal 206 being subjected to the extraction steps 204 and 208, respectively, comprise newly acquired data (live audio/video signals, or recorded audio/visual signals for which gesture recognition is desired).

At step 212, a comparison process is undertaken whereby the results of the co-analyzed signals 202 and 206 are compared with the classification developed during the training step illustrated in FIG. 1. Based upon this comparison, a decision is made regarding the meaning of any gestures contained in the visual and audio signals 202 and 206.

FIG. 2 also illustrates an optional step 213, whereby other audio and visual classification data, derived from use of known prior art methods on the same visual and audio signals 202 and 206, are utilized with the comparison of step 212 to improve the resolution of the comparison made at comparison step 212. These other audio and visual classification methods and results thereof can be utilized in reaching the decision of decision step 214.

Figure 3:
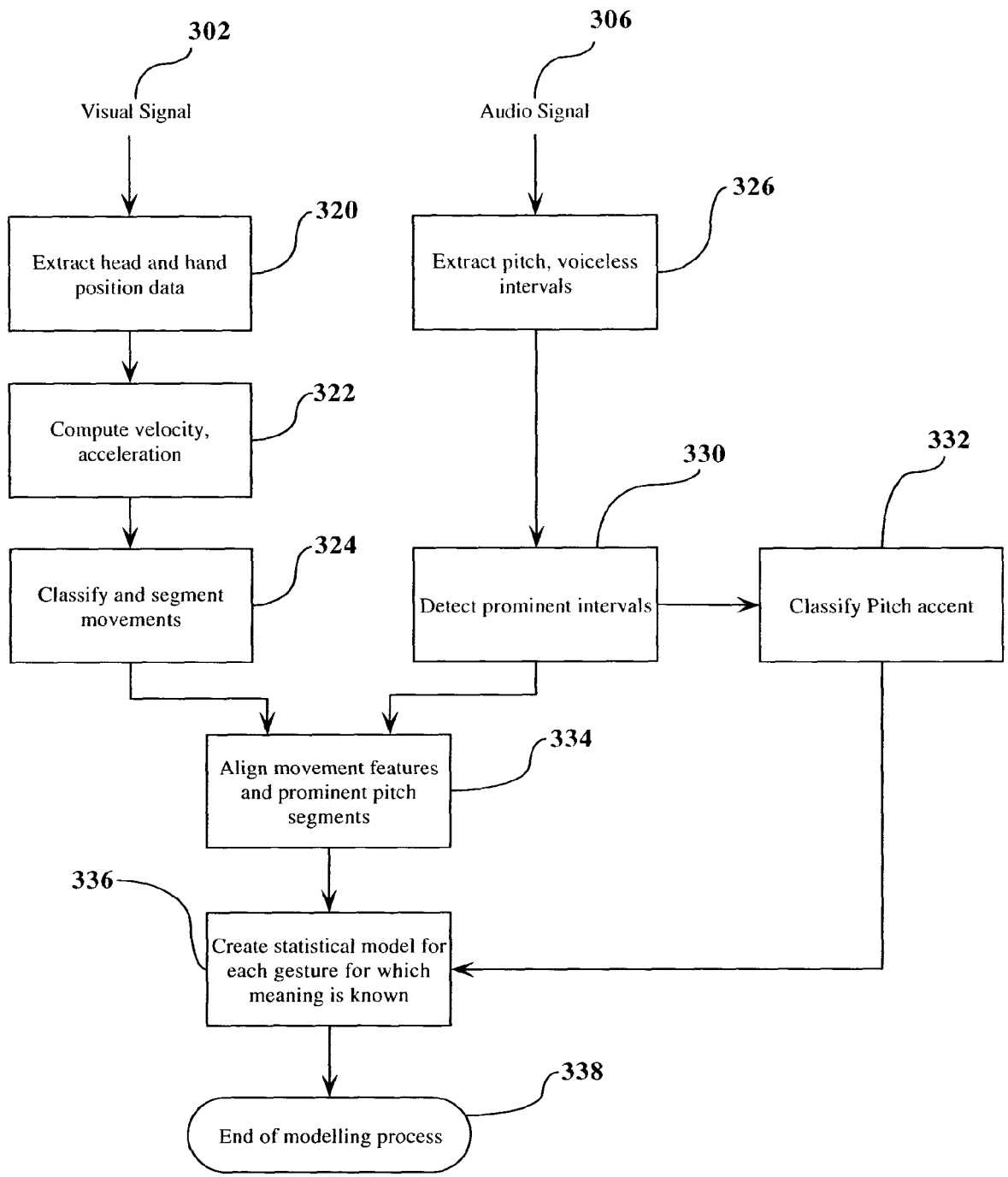
FIG. 3 illustrates the steps performed during the training process illustrated in FIG. 1, but in more detail.

FIG. 3 illustrates the steps performed during the training process illustrated in FIG. 1, but in more detail. Referring to FIG. 3, the visual aspects of a signal 302 and the corresponding audio aspects of the same signal 306 are subjected to feature extraction processes, beginning at steps 320 and 326, respectively.

With respect to visual signal 302, at step 320, precise visual elements of the signal are extracted, e.g., the position of the head and hands at each moment in time of the visual signal 302. Using known visual tracking methods, the velocity and acceleration of the elements being measured (e.g., the head and hands in this example) are computed, and at step 324, each movement, based upon its position, velocity and acceleration, is segmented based on a velocity profile and classified according to the visual observation as belonging to one of the gesture primitive categories.

With respect to the audio signal 306, in accordance with the present invention, at step 326, a correlate of audio pitch, fundamental frequency ($F_0$), is extracted at each moment in time. Voiceless intervals, representing pauses in speech, are filtered as much as possible on $F_0$ from those related to the consonants.

At step 330, acoustically prominent intervals are detected, that is, intervals that would usually correspond to sharp changes in the voice intonation and prolonged pauses.

At step 332, detected acoustically prominent intervals from step 330 are classified into rises or falls of intonational accents.

At step 334, the movement features extracted and classified in steps 320-324, and the audio features, extracted and classified in steps 326-330, are aligned (correlated in time) so that a correlation can be made between gestures occurring at each time interval in the visual signal and the associated audio features that occur at the exact same moments in time. At step 336, the known information regarding what a particular gesture represents is utilized to create a statistical model for each gesture primitive, the model being a combined visual and audio "signature" of the gesture based upon the prosody of the audio signal at any given moment in time.

Once these models are created they are stored and the process terminates at step 338.

Figure 4:
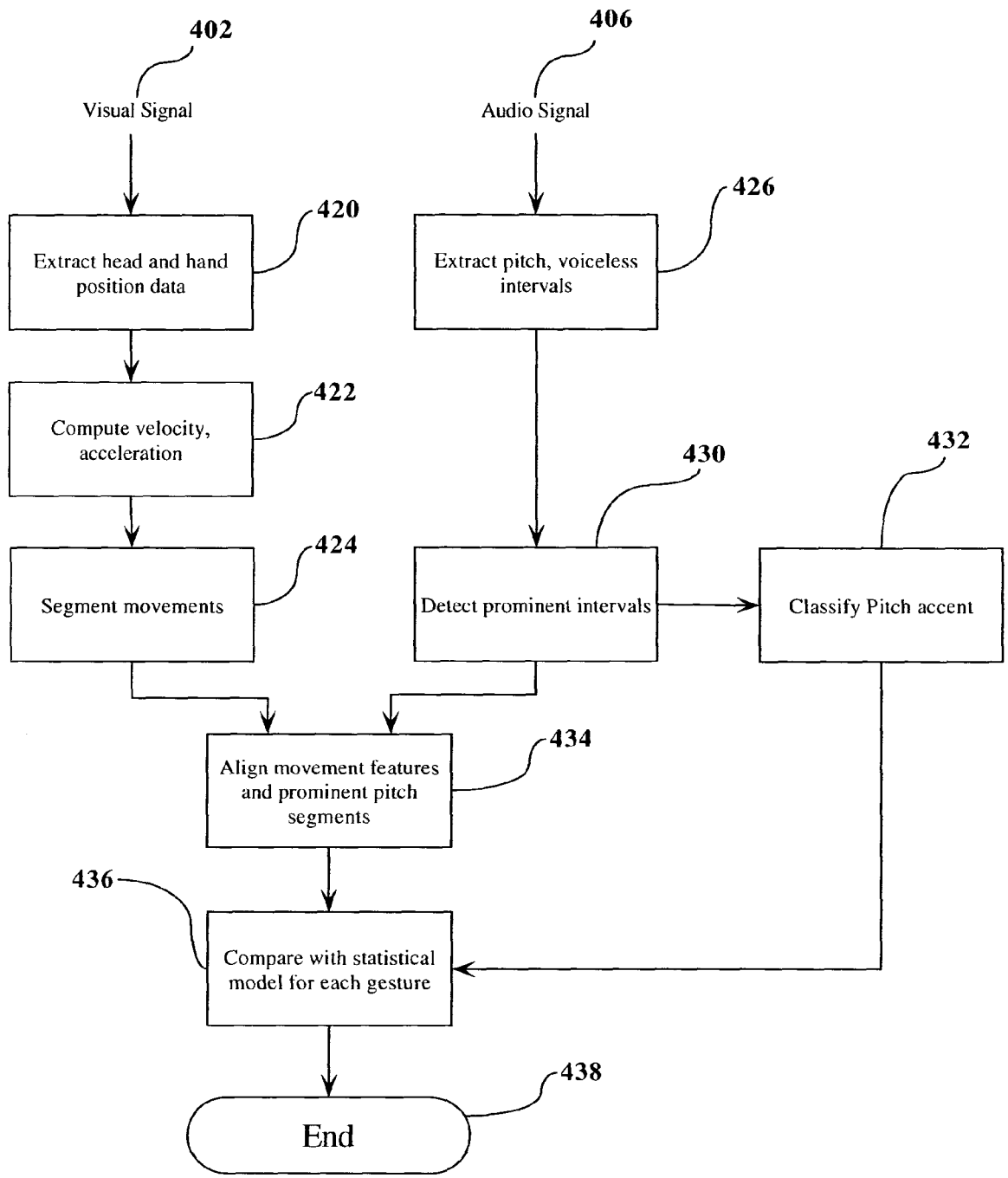
FIG. 4 illustrates the use of the models developed in the modeling process illustrated in FIGS. 1 and 3.

FIG. 4 illustrates the use of the models developed in the modeling process illustrated in FIGS. 1 and 3, i.e., FIG. 4 provides more detail to the general description of the present invention given with respect to FIG. 2. The steps of FIG. 4 are essentially identical to those of FIG. 3, with the exception of steps 424 and 436.

At step 424, known methods for gesture recognition are used to create a set of hypotheses regarding similarity of gestures from the current data to a particular gesture primitive, based on the velocity and acceleration characteristics of head/hand movements. Each hypotheses presents a visual segment that is aligned with pitch segments in step 434, similar to step 334.

At step 436, audio/visual signal alignments for each hypotheses is compared to the models from step 336. The best matching hypotheses is selected (or identified and all hypotheses forwarded with appropriate matching scores) and the process terminates at step 438.

Using the above described technique, discrete and unique prosodic cues are developed and associated with gestures so that, when audio/visual signals are analyzed, these cues increase the probability that a particular gesture being analyzed will be correctly identified for what it means. In other words, if a particular prosodic "signature" occurs frequently with a particular visual gesture cue, the system can fairly reliably identify the meaning of that gesture, in contrast to keyword based gesture recognition, which has the above described problems, particularly those related to contextual use of words.

EXAMPLE

The following is a discussion of an example of the operation of an illustrative embodiment of the present invention, along with an explanation of the theory behind its operation.

Feature Extraction

Previously recorded Weather Channel broadcast video was were digitized in MPEG-4 format. The data was prepared by separately extracting visual and audio data from each sequence of recorded video/audio. The extracted data and the original video/audio sequences information were used to label gesture intervals on over 60 minutes of video. Unlike multi-joint models, an end-effector description was assumed for gestures such that only point position of the head and the hand are used. Such model has been previously found descriptive enough to capture gesture phases in a large display domain.

Visual Feature Tracking

A previously developed algorithm for visual tracking was applied to extract the positional data for the head and the hands of the narrator. The algorithm is based on motion and skin-color cues that are fused in a probabilistic framework. A face detector was employed for robust user detection and continuous head track status verification. The implementation is based on neural networks and favors a very low false positive of <0.5%. The skin color sample extracted from the face was used to detect hands. For each frame and each tracked body part, a number of candidate body part locations were generated within a window defined by the location of the body part in the previous frame and the current estimate of the predicted motion. The true trajectories of the body parts were defined as the most probable paths through time connecting candidate body part locations. The Viterbi algorithm was used to efficiently determine this path over time. This approach effectively models position of the hand and head regions as skin-colored moving blobs. The positional tracking was re-initiated if the tracker algorithm failed in the events of self-occlusions of the hands from the-camera's viewpoint.

Extraction of Pitch Correlate from Audio

Accentuation is a compound prosodic attribute. If features that are related to the accentuation were ranked in terms their contribution, then gross changes in pitch would contribute the most, duration would be intermediate, and loudness would be the least important in spontaneous English. For this reason, the formulation used by Applicant in this example is limited to the fundamental frequency contour. $F_0$ was extracted from the audio by employing the known autocorrelation method, using PRAAT software for phonetics research. The resultant contour was pre-processed such that unvoiced intervals of less than 0.03 sec and less then 10 Hz/frame (0.01 sec) were interpolated between the neighboring segments to remove some unvoiced intervals caused by the consonants.

Gesture Segmentation for Training

A known Gesture Analysis Tool was utilized for manual segmentation of the training set of gesture phases. An expert coder used the audio-visual playback and the extracted velocity profile of the hand to label the segments. Near 100% accuracy of manual segmentation was achieved by associating gestures (strokes) with spoken context. This process was bootstrapped by an HMM-based segmentation. Multiple tiers were used to represent gesture primitives, auditory prominence, and deictic category of gesture strokes. Hold, preparation, and retraction primitives were admitted to the training and test sets if they were associated with deictic strokes. Circle stroke was excluded from the both co-analyses due to infrequent observations and unique movement pattern that was attributed with high recognition rates.

Feature-based Co-analysis of Hand Kinematics and Pitch

Feature-based co-analysis is designed to explore involuntary interruptions (physiological constraints) during coverbal gesture production. It is also expected that manifestations of the co-articulatory phenomenon may be included. To model the gestures, both kinematical characteristics of the hand movement and intonational dynamics were considered. Applicant did not aim to distinguish any characteristics of co-occurring intonation other than the acoustic silence during the guided phase of the hand movement and phonological synchronization. Continuous hand movement is presented as a sequence of the defined gesture primitives. Since the kinematics for every gesture phase can be explained as a combination of ballistic and guided movement phases, its transitional pattern could be statistically represented as a sequence of finite states. If the observed involuntary interruptions constitute a pattern of how the breaks in the pitch co-occur with movement phases, the separation of the states during their estimation and evaluation should be improved.

Audio-Visual HMM

Applicant employed a forward Hidden Markov Model framework to estimate the likelihood of a gesture primitive. A gesture primitive $\omega_i$ is defined as joint stochastic processes of the gesture kinematics and the intonational correlate over a suitable time interval T. The parameter vector of observation sequence G at time t was defined as:

$$g_t = \langle v_h, a_h, v_{hd}, a_{hd}, |S_{h,hd}|, v_{h,hd}, F_0, \dot{F}_0 \rangle, 1 \leq t \leq T.$$

where the movement kinematics was represented by 2D positional and time differential parameters of the hand and the head movement. $v_h$, $a_h$ and $v_{hd}$, $a_{hd}$ are velocity and acceleration of hand and head movement correspondingly; $|S_{h,hd}|$ is absolute distance between the hand and the head; and $v_{h,hd}$ is a relative velocity of the hand with respect to the head. Fundamental frequency contour, $F_0$, and its time deferential, $\dot{F}_0$, were used as a feature for pitch correlate. To learn HMM parameters Baum-Welch re-estimation algorithm was applied. The continuous gesture recognition was achieved by using the Token Passing algorithm. This algorithm is based on Viterbi decoding which iteratively calculates the likelihood $p(\omega_i|G)$ of possible sequential gesture interpretations $\omega_i$ given G.

This formulation does not consider pitch dynamics within each $F_0$ segment per se, which to a large extent depends on its phonological structure. Instead, it averages the segments over all training examples providing a phonologically independent representation. This can be viewed as a physiological component of $F_0$ that represents auditory excitation. To account for the intonational dynamics applicant further considered a co-articulation analysis.

Co-articulation Framework

One of the communicative intents of using deictic gestures is usually to attract a listener's attention to the specific context within the discourse. Stresses of intonation (pitch accents) serve an identical purpose in spontaneous speech, when a speaker tries to accentuate important points. The term accentuation usually refers to syllables that are perceived as being more prominent than the others in the spoken discourse. Previously, Kendon showed that the phonological peak syllables tend to synchronize with the peak of the gesture strokes. However, complexity associated with using $F_0$ directly for co-occurrence analysis lies in its close relation to the phonological structure in addition to the tonal discourse. Applicant addressed this by defining a set of correlated point features on the $F_0$ contour that can be associated with the corresponding points on the velocity and acceleration profiles of the moving hand. The alignment pattern (co-occurrence) of gestures and accentuated segments can provide additional information for improving gesture recognition. This constitutes the main idea behind co-articulation analysis.

However, there are additional factors that can affect co-occurrence. Accent type (fall or rise of intonation) could influence the alignment pattern as it may imply different syntactic structures. Also, speech "activity" during the preceding gesture may carry over to the current interval (spillover), especially if it is a compounded stroke. In those cases the alignment statistics could be influenced. To account for these factors, Applicant constructed a Bayesian network that included causal effects of the accent type and the preceding gesture. Then, Applicant defined method for extraction of the acoustically prominent $F_0$ segments and classification of them into fall or rise of intonation. Then, Applicant presented a co-occurrence framework and described inferences from the Bayesian network. Finally, Applicant illustrated how the information from the co-articulation analysis can be fused with the HMM framework for gesture recognition.

Detection of Prosodically Prominent Segments

Prominent segments in an uninterrupted spoken discourse can be thought of as perceptually distinct parts with respect to some base level of prosodic events. Hence, if there is a statistical measure that describes level of prosodic activity in a monologue, then any activity above a certain level can be considered as prominent. In real speech, there are many contextual and narrator-dependent factors that can affect perceptive decision of a listener to classify a part of a speech as prominent. However, due to a relative homogeneity of the presentation style in the Weather Channel data, Applicant assumed a linear decision boundary for detecting the outstanding prosodic events with an established threshold criterion.

A segment is defined as a continuous part $F_0$ contour that corresponds to a voiced interval. Its length can phonologically vary from a single phone or foot (a phonological unit that has a "heavy" syllable followed by a "light" syllable(s)) to an intonational phrase. Deictic markers that tend to co-occur with deictic gestures, mostly fall within the limits of a single segment. Taylor has previously shown that substantial rises and falls in the $F_0$ contour were good indicators of pitch accent locations. Pauses (a voiceless interval on F0 contour, which is not a result of a voiceless consonant) are also an important component of prominence. During spontaneous speech alone they are usually associated with the discourse related factors such as change of topic. In addition, they also have an important role in speech and gesture production. Hence, Applicant introduced a compound feature that utilizes both amplitude of $F_0$ and duration of voiceless intervals to model prosodic discourse. To detect prominent parts, Applicant developed an empirical method that involved perceptual studies to establish criteria for acoustic prominence in the presented domain.

Model of Prosodic Discourse

The problem of prominent segments detection in the spontaneous speech could be considered as a binary classification problem. Applicant assumed that prosodic discourse can be modeled by a feature set $P \square N (\mu, \Sigma)$ with an observation vector $p_i$ for every $F_0$ segment i defined as:

$$p_i = [\xi_{max}, \xi_{min}, \dot{\xi}_{max}]^T,$$

where, $\xi_{max}$ and $\xi_{min}$ are prominence measures, and $\dot{\xi}_{max}$ is the maximum gradient of a given $F_0$ segment. $\xi_{max}$ is calculated as a product of the duration of the preceding pause and the $F_0$ shift between the end of the previous contour and the maximum of the current $F_0$. Similarly, Applicant computed $\dot{\xi}_{min}$ taking the minimum of $F_0$ contour. Inclusion of max and min accounts for possible low or high pitch accents. The frequency shift between the segments was selected instead of absolute measures to give a consideration to the discourse. To extract the maximum gradient of a pitch segment, $\dot{\xi}_{max}$, Applicant used Canny's edge detection algorithm with a Gaussian smoothing ($\sigma=0.8$).

The solution for prominent $F_0$ segments detection are to be sought towards the "tails" of the normally distributed $p_i$. Analysis of the constructed histograms originally indicated heavy tails for $\xi_{max}$, $\xi_{min}$ and $\dot{\xi}_{min}$ distributions. Applicant applied Yeo-Johnson log transform to improve normality.

Perceptual Threshold and Prominence Detection

To find an appropriate level of threshold to detect prominent segments, Applicant employed a bootstrapping technique involving a perceptual study. A control sample set for every narrator was labeled by 3 naïve coders for auditory prominence. The coders did not have access to the $F_0$ information. The task was set to identify at least one acoustically prominent (as delayed or intonationally accented) sound within the window of 3 sec. The overlapping of windows was considered to account for unusually elongated pauses. In addition, every 10 sec. the utterance was replayed to ensure all discourse related prominence was not left undetected.

A Mahalanobis distance measure $d^2=(p_i-\mu)^T\Sigma^{-1}(p_i-\mu)$, where discourse $P \square N (\mu,\Sigma)$, was used to form the decision boundary for prominent observations as labeled by the coders. Allowing 2% of misses, a speaker-dependent threshold ($d^2=0.7-1.1$) was established for the all eight narrators. If a segment i with an observation vector $p_i$ appeared to pass the threshold value $d^2$ it was considered for co-occurrence analysis with the associated gesture primitive. The conservative decision boundary resulted in a high false alarm rate of up to 40%.

Classification of Accented Segments

Once a given $F_0$ segment has been classified as prominent, it is considered for pitch accent classification. A tone that associated with an accented syllable (marked with "*") defines presence of the pitch accent. In English, there are six types of the pitch accent distinguished, two simple and four complex. The simple high accent (H*) is the most frequently used, it occurs much higher in the pitch range then L* which represents a local minimum on $F_0$. The complex accents are composed of two tones, one of which is aligned with a stressed syllable, they are: L*+H, L+H*, H+L*, and H*+L. Pierrehumbert et al. proposed that intonational prominence marks information that the speaker intends to be predicated, or shared with a listener. They hypothesized that only H* and L+*H accented information is meant to be asserted, which usually consists of a verb with or without object, complements, or adverbial modifier. In another words use of different accents could contribute to a different co-articulation pattern.

To provide an automated procedure Taylor proposed a continuous representation for specifying accent. According to his model H*, L+H* and L*, L*+H, H+L* can be differentiated into 2 classes based on the tilt of the $F_0$ slope. Note that this categorization is the same as for the predicate properties defined by Pierrehumbert et al. For the sake of simplicity, Applicant accepted the following notation: set {H*, L+H*} will be denoted by H and set {L*, L*+H, H+L*} by L.

To model time series pattern of accent class $a_i\equiv\{H,L\}$ two separate HMMs were defined over suitable time interval corresponding to the duration of $F_0$ segments. The parameter vector of the observation sequence F at time t was composed of $F_0$ and its time differential: $f_t=\langle F_0, \dot{F}_0\rangle$. Empirical evaluation led to a choice of the 4-state HMMs. A total of 158 samples were used as a training set. After a $F_0$ segment was classified as prominent $a_i$ was chosen with the highest estimated likelihood $p(a_i|F)$.

Audio-Visual Feature Co-occurrence

The core of the co-articulation analysis is the alignment model of prominent $F_0$ segments and hand kinematics. As it was mentioned earlier, $F_0$ is heavily influenced by the phonetic component. Hence, Applicant defined a framework that would rely on the feature set that consider only extremities of $F_0$, e.g. beginning of the segment, maximum and minimum, and the maximum slope (edges).

Alignment Model

For every kinematically defined gesture class $\omega_i$, Applicant assumed that there existed at least one co-occurrence class $\omega^a_i$ that would have the same kinematical representation as $\omega^i$. To model $\omega^a_i$, it was hypothesized that the temporal alignment of the active hand velocity profile and the prominent pitch segments can be presented by a multi-dimensional feature space M with an observation vector m for some $F_0$ segment j on the $\omega^a_i$ interval defined as $$m_j=[\tau_0, \tau_{max}, \tau_{min}, \dot{\tau}_{max}]^T,$$

where all the features are assumed to be normally distributed, i.e., N ($\mu,\Sigma$). The gesture onset $\tau_0$, is the time from the beginning of the gesture (phase) to the beginning of the prominent segment, which has at least a part of its $F_0$ contour presented within the duration of the gesture primitive. The gesture peak onset $\tau_{max}$, is the time from the peak of the hand velocity to the maximum on the $F_0$ segment (high pitch accents). Similarly, Applicant computed $\tau_{min}$ for low pitch accents. $\dot{\tau}_{max}$ was offset between the maximums of the gesture acceleration, $\dot{V}_{max}$, and the fundamental frequency time differential, $\dot{F}_{0_{max}}$, where, $\dot{V}_{max}$ was extracted using Canny's formulation for edge detection with $\sigma=1.0$.

A set of 446 labeled examples was used to learn the statistics for every gesture class. The training data set was preprocessed in advance such that only $m_j$ of the most prominent segment (with the largest Mahalanobis distance, cf. section 0) on a $\omega^a_i$ interval was considered for M estimation. To find which gesture class $\omega^a_i$ was the most likely to be represented by an observation vector m, Applicant employed a nearest neighbor classifier. Since several $F_0$ segments could be located within a gesture interval, all the $m_j$ on the gesture interval were evaluated. The next subsection presents findings from the evaluation of test set of 1262 primitives.

Audio-Visual Synchronization

As it was mentioned earlier, it was expected that difference in H and L could introduce a shift in the alignment pattern of the resulted $F_0$ and the hand velocity. Applicant included them in the definition of gesture stroke and $F_0$ co-occurrence: $point^H$, $point^L$, $contour^H$, and $contour^L$. Preparation and retraction were left without the accent definition.

Analysis of the resulted models indicated that accent type separation of the contour strokes ($contour^H$ and $contour^L$) was not enough to model variability of co-occurrence. Therefore, Applicant redefined the classes of co-occurrence models by differentiating contour gestures to account for the variability caused by the type of deictic reference. Applicant adopted the following definitions for the same kinematical representations of the contour ($\omega_i$) from the semantic framework used in iMAP studies. Contour gestures that refer to static spatial attributes (transitive deixis), e.g., "... along the East <contour> coast line ...", Applicant denoted it as contour_s. Class contour_m was used to indicate some spatial displacement or direction (intransitive deixis), e.g., " ... weather front $\overset{contour}{moving\ up}$ ... ".

Hence, contour primitives have definition in the co-occurrence domain as: contour_s$^H$, contour_s$^L$, contour_m$^H$, and contour_m$^L$.

The velocity peaks of the contour_s strokes were found to closely coincide with the peaks of the pitch segments ($\tau_{max}$=0.078 sec). Contour_m strokes appeared to have large $\tau_{max}$ offsets (0.187 sec), when point had in average 0.079 sec. Pointing was quite silent, however, most of the segments were aligned with the beginning of the post-stroke hold interval. The difference between contour$^H$ and contour$^L$ types was clearly in the offsets of $\tau_{min}$ that L-type was delayed for 0.2 sec for both contour_s and contour_m strokes. Preparation and retraction both had negative $\tau_{max}$ (peak of the gesture is delayed with respect to $F_{0\ max}$) of 0.02 sec., which might be segments that were co-occurring with the preceding phase.

At the first level, Applicant separated coverbal (meaningful) gestures (strokes) from the auxiliary movements that include preparation and retraction phases. Applicant also excluded strokes that were re-articulation of previous gestures. This happens when a stroke is followed by the identical stroke where the second movement does not have an associated speech segment. At the second level, coverbal strokes were further classified according to their deixis, point$^L$ and point$^H$ categories ($\omega_i^a$) were eventually collapsed as the result of further analysis. Distinction of the accent and deixis type in contour_s$^H$, contour_S$^L$, contour_m$^H$, and contour_m$^L$ showed to be useful in achieving 76.47% (versus 52.94%) of correct recognition rate using nearest neighbor classifier. Most of the preparation and retraction turned out to be silent resulting in 37.5% and 20% correct. Pointing was correctly classified in 64.7% of occurrence, where 42.7% of the all the errors were attributed to contour_m type substitution.

Bayesian Network

For co-articulation analysis we combine a set of the classifiers introduced earlier into a Bayesian network. The nodes of the network were modeled as the discrete variables with assertions of their conditional independence. Applicant defined accent and previous co-occurrence class $\omega_{i(t-1)}^a$ variables as the input (parent) nodes, co-occurrence class variable $\omega_{i(t)}^a$ as the input-output (child) node, and output node as the gesture class $\omega_i$. Bi-gram model of co-occurrence classes was modeled by causal dependency of $\omega_{i(t-1)}^a$ on $\omega^{i(t)a}$ within the Bayesian network.

The resulted causal dependencies between the classifiers in the Bayesian network were estimated using the Chickering et al. method, with a greedy search algorithm over parameter maps implemented as the decision graphs. WinMine toolkit software was utilized for this analysis. The same training set of 1262 gestures that was used as a test sequence for co-occurrence models was utilized for the network parameter estimation. The causality rank was defined by the Bayesian score (posterior probabilities).

Inference for Co-articulation Analysis

As it was expected, the strongest dependency was observed between co-occurrence model $\omega_{i(t)}^a$ and the kinematically defined gesture primitive $\omega_{i(t)}$. Not surprisingly, the accent type was found important for determining the co-occurrence type and less important for estimation of $\omega_{i(t)}$. Word model of $\omega_{i(t)}^a$ and $\omega_{i(t-1)}^a$ received the lowest rank, but $\omega_{i(t-1)}^a$ showed stronger relationship to the kinematical representation $\omega_{i(t)}$.

A binary decision tree derived from the Bayesian network for the pointing gesture ($\omega_{i(t)}^a$) distribution was created. Accent type was not found to affect co-occurrence decision directly for the pointing gesture due to the weak distinction between point$^L$ and point$^H$. Eventually, those were merged into a single point category without accent distinction for $\omega_{i(t)}^a$. This could be a result of a large variability of usually delayed prominent speech segment with respect to the pointing movement of the hand, which was located within the following post-stroke hold interval. Pointing gesture also was strongly conditioned on the preceding preparation ($\omega_{i(t-1)}^a$) with probability of 0.742. If it was not classified as preparation, hold was the mostly likely to follow the pointing (0.341). If co-occurrence class was not classified as point, accent variable (Not 0) provided significant contribution for the contour classification (0.235). If there was no prominent segment found on the interval the decision relied on the $\omega_{i(t-1)}^a$. Where a non-point gesture (with non-prominent speech) was preceded by preparation, it was likely to be followed by another preparation (0.433). Examples of this are usually seen in a compounded preparation movement that might have include a gaze in the middle of the movement resulting in the two kinematically complete primitives. If a non-pointing gesture ($\omega_{i(t)}^a$) was preceded by any other gesture then preparation ($\omega_{i(t-1)}^a$) it was more likely to be classified as the retraction ($\omega_{i(t)}$).

A local distribution of co-occurrence classes for H and L accents extracted from the inferred decision graph was created. The learned probability distribution of co-occurrence classes (based on the performance of the co-occurrence classifier) was affected by the type of the pre-classified accent. Preparation was the most likely to contain both types of accent (0.356 and 0.201), while retraction remained silent with only 0.002 and 0.049 probabilities. Point was found to be associated with both H and L. Overall there was a significant difference between contour$^H$ and contour$^L$ types or each of the accents with the correct correspondence of H and L. Contour stroke with the static reference (transitive deixis) was most likely to contain H accent, corresponding to predicated constructions. Intransitive contour stroke was the most probable to co-occur with L.

Fusion of Co-analyses

The probability likelihood of the gesture primitive $\omega_i$, $p(\omega_i|N)$, was estimated from the Bayesian network, where N denotes set of parameters estimated from the naïve classifiers in the co-articulation analysis. The Markov-blanket inference method was used for computing $p(\omega_i|N)$, where the probability was evaluated as a function of both the local distribution of the output variable, and the local distributions of its children. Similarly, using the feature-based co-analysis model Applicant computed the probability of the gesture class $\omega_i$, $p(\omega_i|G)$ from the HMMs. To derive a decision about $\omega_i$, given audio-visual signal O defined over a suitable time T, Applicant fused of $p(\omega_i|N)$ and $p(\omega_i|G)$, such that:

$$p(\omega_i|O) = w_1 \cdot p(\omega_i|N) + w_2 \cdot p(\omega_i|G),$$

where weight $w_j$ was derived based on the performance of the classifier, i.e.:

$$w_j = \frac{\hat{P}_j}{\sum_{j=1}^{2} \hat{P}_j}.$$

where $\hat{P}_j$ is a accuracy of given co-analysis method. The resulting probability score was used to assign the class label ($\omega_i$) for a gesture phase.

Results of Continuous Gesture Recognition

The total of 446 gesture examples from the segmented video were used for HMMs training. Applicant used three models to demonstrate the effect of the investigated co-analyses. First, Applicant considered (visual) HMMs model, which did not include an $F_0$ feature and was based only on the analysis of visual features. The second test included both kinematical and pitch features resulting in the feature-based co-analysis (audio-visual HMMs). The third experiment included both audio-visual HMMs and co-articulation (Bayesian) network (1262 training examples) which were fused in accordance with the scheme defined above. 1876 gestures were included for the test sequence.

All models utilized the same training and test sequences. To improve the training set, Applicant preprocessed corresponding intervals on $F_0$ contour removing non-prominent segments. Applicant empirically selected topology for the forward HMMs such that: point included 6 states; contour and retraction −5; preparation, and hold −4.

Gesture Recognition with Feature-based Co-analysis

The results of the continuous gesture recognition using only visual signal (visual HMM) showed that 72.4% of 1876 gestures were classified correctly. Further analysis indicated that gesture pairs of preparation-pointing and contour-retraction constituted most of the substitution errors. This type of error, which can be attributed to the similarity of the velocity profiles, accounted for the total of 76.3% of all the substitution errors. Deletion errors—(errors that typically occur when a gesture primitive is recognized as a part of another adjacent gesture) were mostly due a relatively small displacement of the hand during a pointing gesture. Those constituted approximately 58% of all the errors.

The results of the audio-visual HMM analysis showed an overall improvement in the correct recognition rate of 75.6% (Vs. 72.4%). The most significant improvement was observed in the reduction of the insertion errors to 4.7% (from 6.3%). This surplus was due to removing false point and preparation phases. These were accounted for 42% of the error rate reduction. A marginal improvement was observed with deletion (11.9% Vs. 12.1%) and substitution (7.8% Vs. 9.2%) errors. The declined rate of substitution was mostly due to the reduction in contour_m type and preparation substitutions. Reduction of the deletion type was mostly attributed to distinguishing a preparation from the following contour gesture. Those were originally recognized as one contour stroke.

Gesture Recognition with Co-articulation and Feature-based Co-analyses

The results of the continuous gesture recognition, using audio-visual HMMs and Bayesian network, indicated significant improvement over the visual HMM and the audio-visual HMM. The accuracy rate of recognition was 84.2% for all qualified 1876 gesture primitives in the test sequence. Overall, there was a significant improvement of the substitution (2.9% Vs. 7.8%) and insertion errors (4.7% Vs. 6.3%). Most notable was improvement of the substitution errors. Disambiguation of preparation-pointing and contour-retraction pairs was primary contribution in the error reduction, which constituted approximately 65% of the improved cases with respect to the visual HMM analysis. Improvement of the insertion error type over the audio-visual HMM (3.8% Vs. 4.7%) was due to the partial removal of false contour gestures. Co-articulation network resulted in 3% deletion improvement over the visual HMM (9.1% Vs. 12.1%), while the audio-visual HMM almost did not show any improvement (11.9% Vs. 12.1%). This was due to inclusion of the small pointing gestures that were previously merged with post-stroke holds in the audio-visual HMM analysis.

Results of the continuous gesture recognition demonstrated the effectiveness of the prosody-based co-analysis showing a significant improvement of the continuous gesture recognition rates. Presented frameworks for feature-based (audio-visual HMM) and co-articulation (Bayesian network) analyses played complimentary roles in improving the recognition rate. They addressed problems of disambiguating noisy kinematical observations of gesture phases at the two levels, which were motivated by voluntary and involuntary contributions during the multimodal articulation. Applicant's exemplary formulation indicated better performance (84.2% Vs. 59.4% accuracy) over previously applied keyword-based co-occurrence analysis in the same domain. The notable difference between the approaches was that co-analysis models were defined for all kinematical primitives, while in the prior art methods, only the gesture strokes could be correlated with meaningful keywords.

Results of feature-based co-analysis showed some improvement over all error types. Preliminary observations for pointing strokes showed that $F_0$ contour exhibits decreased or complete absence of speech activity during the guided phase of the movement, which involves intensive eye-hand coordination phase. This was confirmed by almost 65% reduction of the insertion errors after applying the audio-visual HMM analysis. In addition to removing false point gestures, it contributed to the removal of false preparation primitives. It could be explained by the existence of a guided phase at the end of a preparation movement. Overall, this is an extremely interesting phenomenon that is common for deictic gestures and may not be manifested in face-to-face communication. It deserves further experimental investigation with more elaborate formulations to account for the inherent phonological variability of $F_0$ feature.

Results of the co-articulation co-analysis showed significant improvement in recognition accuracy. The major contribution of co-articulation analysis was an improved decision boundary between contour-retraction and point-preparation pairs. It was one of the fundamental weaknesses of visual HMM analysis due to the similarity of the respected velocity and acceleration profiles. This improvement was due to the relative prominence of the co-occurring speech with the meaningful gesture strokes (contour and point), while auxiliary preparation and contour appeared to be deaccented. Another difference from the audio-visual HMM analysis was the ability to detect pointing gestures, which were characterized by a small positional displacement of the gesturing hand. It was very characteristic to the narrators on Weather Channel to use small pointing gestures if the stroke was compounded and the end of preceding gesture (without retraction) was near the referred location on the map. Limitation of the co-articulation analysis was on a part due to the similarity with the keyword-based method. Co-occurrence models that constituted the core of the analysis considered were reliable only for meaningful strokes, which were likely to contain emphasized spoken utterance. The results have brought up several an important issue of differentiating co-articulation categories from the kinematically defined gesture primitives. The distinction between these lies in the effect of the conveyed context of speech on multimodal synchronization. Deictic reference and intonational pattern appeared to be significant dimensions in disambiguating the co-occurrence categories for contour strokes. In fact, contour gesture that denotes a direction of movement was found close to the pointing gesture pattern. Results for correlation of different intonation (H and L) and different types of the contour deixis also have interesting implications as shown by Pierrehumbert et al. They both imply dependency on syntactic structuring of speech.

CONCLUSIONS

The present invention presents novel approaches for combining visual and speech signals for continuous gesture recognition. Two different embodiments of prosodic co-analysis are described, namely, audio-visual feature co-analysis using HMMs and co-articulation analysis employing a Bayesian network of naïve classifiers. Feature-based co-analysis, which was motivated by the interruptions of audio-visual signal during coverbal gesture production, proved to be effective in discarding false point and preparation gesture primitives. Motivated by the communicative intent, a co-articulation analysis was introduced. It was based on the alignment pattern of intonationally prominent parts of speech with kinematically defined gesture primitives. This co-analysis significantly lowered substitution errors associated with the kinematical similarity of point-preparation and contour-retraction pairs. Overall, the two co-analyses complimented different information to boost gesture recognition.

The developed methodology was applied to a domain with unrestricted gesticulation. The Weather Narration data was chosen as a bootstrapping domain to investigate the possibility of using prosodic information to improve natural gesture recognition. The narrative mode in Weather domain allowed us to investigate interaction-free multimodal patterns, understanding of which is essential before considering an HCI setting. Training of narrators and uninterrupted mode of conversation permitted use of relatively simple methods for the prosodic analysis. The applicability of the current methodology to the other relevant domains with different scenarios is warranted by the use of the segmental approach to represent continuous gestures as a sequence of the kinematical primitives.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation being used to run the analysis performed by the present invention. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the drawings support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

The invention claimed is:

1. A method of gestural behavior analysis, comprising the steps of:
    performing a training process using a combined audio/visual signal as a training data set, whereby prosodic audio features of said training data set are correlated with visual features of said training data set;
    producing a statistical model based on results of said training process; and
    applying said model to an actual data set to classify properties of gestural acts contained therein
    wherein said training process comprises at least the steps of:
    dividing said combined audio/visual signal into an audio component and a visual component;
    identifying observable visual features of said visual component;
    identifying observable prosodic features of said audio component; and
    co-analyzing said audio and visual components to establish a correlation between said observable visual features and said observable prosodic features.

2. The method of claim 1, wherein said training process further comprises at least the step of storing a database of reference gesture models, kinematical phases of gestural models, intonational representations of speech models, and combined gesture/speech models.

3. The method of claim 2, wherein said step of applying said model to an actual data set includes at least the steps of:
receiving an actual data set comprising a sequence of images and audio data corresponding to said sequence of images;
dividing said actual data set into an audio component and a visual component;
identifying observable visual features of said visual component of said actual data set;
identifying observable prosodic features of said audio component of said actual data set; and
comparing said identified observable visual and prosodic features of said visual and audio components of said actual data set, respectively, with said models stored in said database.

4. The method of claim 1, wherein said co-analyzing step comprises using a probabilistic framework to fuse gesture/speech co-occurrence information and visual gesture information to determine gesture occurrence in said actual data set.

5. The method of claim 4, wherein said probabilistic framework comprises a Bayesian framework.

6. A system of gestural behavior analysis, comprising:
means for performing a training process using a combined audio/visual signal as a training data set, whereby prosodic audio features of said training data set are correlated with visual features of said training data set;
means for producing a statistical model based on results of said training process; and
means for applying said model to an actual data set to classify properties of gestural acts contained therein
wherein said training process comprises at least:
means for dividing said combined audio/visual signal into an audio component and a visual component;
means for identifying observable visual features of said visual component;
means for identifying observable prosodic features of said audio component; and
means for co-analyzing said audio and visual components to establish a correlation between said observable visual features and said observable prosodic features.

7. The system of claim 6, wherein said training process further comprises at least means for storing a database of reference gesture models, kinematical phases of gestural models, intonational representations of speech models, and combined gesture/speech models.

8. The system of claim 7, wherein said means for applying said model to an actual data set includes at least:
means for receiving an actual data set comprising a sequence of images and audio data corresponding to said sequence of images;
means for dividing said actual data set into an audio component and a visual component;
means for identifying observable visual features of said visual component of said actual data set;
means for identifying observable prosodic features of said audio component of said actual data set; and
means for comparing said identified observable visual and prosodic features of said visual and audio components of said actual data set, respectively, with said models stored in said database.

9. The system of claim 6, wherein said means for co-analyzing comprises means for using a probabilistic framework to fuse gesture/speech co-occurrence information and visual gesture information to determine gesture occurrence in said actual data set.

10. The system of claim 9, wherein said probabilistic framework comprises a Bayesian framework.

11. A computer program product for performing gestural behavior analysis, the computer program product comprising a computer-readable storage medium having computer-readable program code embodied in the medium, the computer-readable program code comprising:
computer-readable program code that performs a training process using a combined audio/visual signal as a training data set, whereby prosodic audio features of said training data set are correlated with visual features of said training data set;
computer-readable program code that produces a statistical model based on results of said training process; and
computer-readable program code that applies said model to an actual data set to classify properties of gestural acts contained therein
wherein said computer-readable program code that performs a training process comprises at least;
computer-readable program code that divides said combined audio/visual signal into an audio component and a visual component;
computer-readable program code that identifies observable visual features of said visual component;
computer-readable program code that identifies observable prosodic features of said audio component; and
computer-readable program code that co-analyzes said audio and visual components to establish a correlation between said observable visual features and said observable prosodic features.

12. The computer program product of claim 11, wherein said computer-readable program code that performs a training process further comprises at least computer-readable program code that stores a database of reference gesture models, kinematical phases of gestural models, intonational representations of speech models, and combined gesture/speech models.

13. The computer program product of claim 12, wherein said computer-readable program code that applies said model to an actual data set includes at least:
computer-readable code that receives an actual data set comprising a sequence of images and audio data corresponding to said sequence of images;
computer-readable code that divides said actual data set into an audio component and a visual component;
computer-readable code that identifies observable visual features of said visual component of said actual data set;
computer-readable code that identifies observable prosodic features of said audio component of said actual data set; and
computer-readable code that compares said identified observable visual and prosodic features of said visual and audio components of said actual data set, respectively, with said models stored in said database.

14. The computer program product of claim 11, wherein said computer-readable program code that co-analyzes comprises computer-readable program code that uses a probabilistic framework to fuse gesture/speech co-occurrence information and visual gesture information to determine gesture occurrence in said actual data set.

15. The computer program product of claim 14, wherein said probabilistic framework comprises a Bayesian framework.

16. A system for real-time continuous gesture recognition, comprising:

a) means for storing a database of reference gesture models, kinematical phases of gesture models, intonational representations of speech models, and combined gesture-speech models;
b) input means for receiving a sequence of images in real time, said images containing a gesticulating subject;
c) input means for receiving an audio signal from the gesticulating subject;
d) means for extracting a sequence of positional data of extremities of the subject;
e) means for extracting a pitch sequence of voice data points from the audio signal;
f) processing means for co-analyzing visual and acoustic signals from a recording; and
g) processing means for utilizing a probabilistic framework to fuse gesture-speech co-occurrence information and visual gesture information to determine gesture occurrence.

17. The system of claim 16 wherein said extremities comprise ahead and hands of a subject.

18. The system of claim 16 wherein said probabilistic framework comprises a Bayesian framework.

19. A method for real-time continuous gesture recognition, comprising:
a) employing a database of reference gesture models, kinematical phases of gesture models, intonational representations of speech models, and combined gesture-speech models;
b) receiving a sequence of images in real time, said images containing a gesticulating subject;
c) receiving an audio signal from the gesticulating subject;
d) extracting a sequence of positional data of extremities of the subject;
e) extracting a pitch sequence of voice data points from the audio signal;
f) co-analyzing visual and acoustic signals from a recording by transforming the sequence of positional data extracted from each image to a sequence of velocity and acceleration features,
   delimiting the sequence of the velocity and acceleration features through comparison to the kinematical phases of gestures,
   extracting a set of acoustically prominent segments from the pitch sequence,
   extracting a set of feature points from the acoustically prominent segments of pitch sequence,
   extracting a set of feature points from the delimited kinematical phases of gestures represented by velocity and acceleration features of the extremities movement,
   extracting a set of alignment measures of the feature points of pitch sequence and feature points of the extremities movement,
   comparing the alignment measures of the feature points of pitch sequence and feature points of the extremities movement,
   comparing the alignment measures of the feature points to co-occurrence gesture-speech models,
   comparing the velocity and acceleration features of the extremities movement to the reference gesture models; and
g) utilizing a probabilistic framework to fuse gesture-speech co-occurrence information and visual gesture information to determine gesture occurrence.

* * * * *